US008753588B2

(12) United States Patent
Desilets et al.

(10) Patent No.: US 8,753,588 B2
(45) Date of Patent: Jun. 17, 2014

(54) SUPPORT AND STAND-OFF RIBS FOR UNDERDRAIN FOR MULTI-WELL DEVICE

(75) Inventors: Kenneth G. Desilets, Westford, MA (US); Stephane Jean Marie Olivier, Rosheim (FR); Christopher A. Scott, Westford, MA (US)

(73) Assignee: EMD Millipore Corporation, Billerica, MA (US)

( * ) Notice: Subject to any disclaimer, the term of this patent is extended or adjusted under 35 U.S.C. 154(b) by 899 days.

(21) Appl. No.: 10/961,778

(22) Filed: Oct. 8, 2004

(65) Prior Publication Data

US 2005/0095175 A1 May 5, 2005

Related U.S. Application Data

(60) Provisional application No. 60/511,396, filed on Oct. 15, 2003.

(51) Int. Cl.
*B01D 35/00* (2006.01)

(52) U.S. Cl.
USPC ............................ 422/534; 422/503; 422/513

(58) Field of Classification Search
CPC ................... B01L 3/50255; B01J 2219/00423
USPC ................................................. 422/102, 101
See application file for complete search history.

(56) References Cited

U.S. PATENT DOCUMENTS

| | | | | |
|---|---|---|---|---|
| 4,427,415 | A | 1/1984 | Cleveland | 436/57 |
| 4,734,192 | A | 3/1988 | Champion et al. | |
| 4,895,706 | A * | 1/1990 | Root et al. | 422/102 |
| 4,902,481 | A * | 2/1990 | Clark et al. | 422/535 |
| 4,948,564 | A | 8/1990 | Root et al. | 422/101 |
| 5,009,780 | A | 4/1991 | Sarrasin | |
| 5,108,704 | A | 4/1992 | Bowers et al. | 422/70 |
| 5,141,719 | A | 8/1992 | Fernwood et al. | 422/101 |
| 5,264,184 | A | 11/1993 | Aysta et al. | 422/101 |
| 5,464,541 | A | 11/1995 | Aysta et al. | 210/767 |
| 6,159,368 | A | 12/2000 | Moring et al. | 210/321.75 |
| 6,309,605 | B1 | 10/2001 | Zermani | 422/101 |
| 6,338,802 | B1 | 1/2002 | Bodner et al. | 210/65 |
| 6,365,871 | B1 | 4/2002 | Knowles et al. | 219/121.7 |

(Continued)

FOREIGN PATENT DOCUMENTS

| | | |
|---|---|---|
| EP | 0 359 249 | 3/1990 |
| EP | 0 403 679 | 12/1998 |

(Continued)

OTHER PUBLICATIONS

"*Whatman: Not Just Another Pretty Multiwell Plate*", Whatman Corporation Product Brochure (Date of Publication: Cannot be determined).

*Primary Examiner* — Natalia Levkovich
(74) *Attorney, Agent, or Firm* — EMD Millipore Corporation

(57) ABSTRACT

Underdrain design for a multiwell device that when fixed to the device (either as an integral or removable component thereof), allows for adequate venting during filtration, minimizes or prevents air lock, and has improved structural integrity. Also disclosed is a laboratory device designed particularly for a multiplate format that includes a plate or tray having a plurality of wells, and an underdrain in fluid communication with each of the plurality of wells. The underdrain can be a separate, removable piece, or can be an integral unitary structure with the plate or tray forming a one-piece design. The design is preferably in compliance with SBS format.

1 Claim, 7 Drawing Sheets

(56) References Cited

U.S. PATENT DOCUMENTS

| | | | | |
|---|---|---|---|---|
| 6,419,827 | B1 | 7/2002 | Sandell et al. | 210/321.75 |
| 6,514,463 | B2 | 2/2003 | Zermani | 422/101 |
| 7,063,216 | B2 | 6/2006 | Lane et al. | |
| 2002/0104795 | A1 | 8/2002 | Cote et al. | 210/323.2 |
| 2002/0155034 | A1 | 10/2002 | Perman et al. | 422/101 |
| 2002/0195386 | A1 | 12/2002 | Young et al. | 210/455 |
| 2003/0066821 | A1 | 4/2003 | Wybrow et al. | 219/121.71 |

FOREIGN PATENT DOCUMENTS

| | | | |
|---|---|---|---|
| WO | WO 97/15394 | 5/1997 | B01L 3/00 |
| WO | WO 98/55233 | 12/1998 | |
| WO | WO 99/34920 | 7/1999 | B01L 3/00 |
| WO | WO 01/45844 | 6/2001 | B01L 3/00 |
| WO | WO 01/51206 | 7/2001 | B01L 3/00 |
| WO | WO 02/096563 | 12/2002 | B01L 3/00 |

* cited by examiner

SUPPORT AND STAND-OFF RIBS FOR UNDERDRAIN FOR MULTI-WELL DEVICE

REFERENCE TO RELATED APPLICATION

This application claims the benefit of Provisional U.S. Patent Application Ser. No. 60/511,396, filed Oct. 15, 2003.

BACKGROUND

Test plates for chemical or biochemical analyses, or sample preparation and purification, which contain a plurality of individual wells or reaction chambers, are well-known laboratory tools. Such devices have been employed for a broad variety of purposes and assays, and are illustrated in U.S. Pat. Nos. 4,734,192 and 5,009,780, 5,141,719 for example. Microporous membrane filters and filtration devices containing the same have become particularly useful with many of the recently developed cell and tissue culture techniques and assays, especially in the fields of virology and immunology. Multiwell plates, used in assays, often utilize a vacuum applied to the underside of the membrane as the driving force to generate fluid flow through the membrane. Centrifugation also can be used as the driving force. The microplate format has been used as a convenient format for plate processing such as pipetting, washing, shaking, detecting, storing, etc.

Typically, a 96-well filtration plate is used to conduct multiple assays or purifications simultaneously. In the case of multiwell products, a membrane is placed on the bottom of each of the wells, or a single membrane extends across all of the wells. The membrane has specific properties selected to separate different molecules by filtration or to support biological or chemical reactions. High throughput applications, such as DNA sequencing, PCR product cleanup, plasmid preparation, drug screening and sample binding and elution require products that perform consistently and effectively.

One such filtration device commercially available from Millipore Corporation under the name "Multiscreen®" is a 96-well filter plate that can be loaded with adsorptive materials, filter materials or particles. The Multiscreen® underdrain has been processed in such a way in order to facilitate the release of droplets. More specifically, the MultiScreen® underdrain includes a spout for filtrate collection. This spout not only directs the droplets but also controls the size of the droplets. Without this underdrain system, very large drops form across the entire underside of the membrane and can cause contamination of individual wells. Access to the membrane can be had by removing the underdrain. However, the device is not compatible with automated robotics equipment such as liquid handlers, stackers, grippers and bar code readers.

The Society for Biomolecular Screening (SBS) has published certain dimensional guidelines for microplates in response to the non-uniformity of commercial products. Specifically, the dimensions of microplates produced by different vendors varied, causing numerous problems when microplates were to be used in automated laboratory instrumentation. The SBS guidelines address these variances by providing dimensional limits for microplates intended for automation.

In embodiments where the underdrain is removable, occasionally the underdrain can disengage from one or more wells, resulting in leakage. This is more likely to occur when the buffer dries in the underdrain spout and blocks the passage of the filtrate, as the resulting build-up of pressure ultimately can cause the underdrain to "pop-off" one or more wells. In addition, if the underdrain does not sit flat against the grid or other support surface used in a vacuum manifold, local disengagement can occur upon application of vacuum, again resulting in undesirable leakage between the underdrain and the plate.

SUMMARY

The present invention provides an underdrain design for a multiwell device that when fixed to the device (either as an integral or removable component thereof), allows for adequate venting during filtration, minimizes or prevents air lock, and has improved structural integrity. The present invention also is directed to a laboratory device designed particularly for a multiplate format that includes a plate or tray having a plurality of wells, and an underdrain in fluid communication with each of the plurality of wells. The underdrain can be a separate, removable piece, or can be an integral unitary structure with the plate or tray forming a one-piece design. The design is preferably in compliance with SBS format.

According to a preferred embodiment of the present invention, there is provided a multiwell device including a multiwell plate or tray having a porous member such as a membrane for filtration, each respective well of the device being in fluid communication with an underdrain spout through the porous member which then directs fluid draining therefrom to a collection plate or the like. The device conforms to SBS guidelines. When positioned or stacked over a collection plate with corresponding wells that register with the wells of the multiwell plate, vents are defined which vent gases from the wells out of the device upon application of vacuum. In addition, a plurality of stand-off ribs associated with each respective well are provided to provide spacing between the underdrain and the collection plate. The multiwell plate (including the underdrain as an integral or removable piece) and collection plate can be placed in a stacked relationship on a vacuum manifold to carry out filtration. Fluid flows from the wells of the multiwell plate, through the membrane, into and out of the spouts of the underdrain, and into complementary wells of the collection plate.

DETAIL DESCRIPTION

Figure 1:
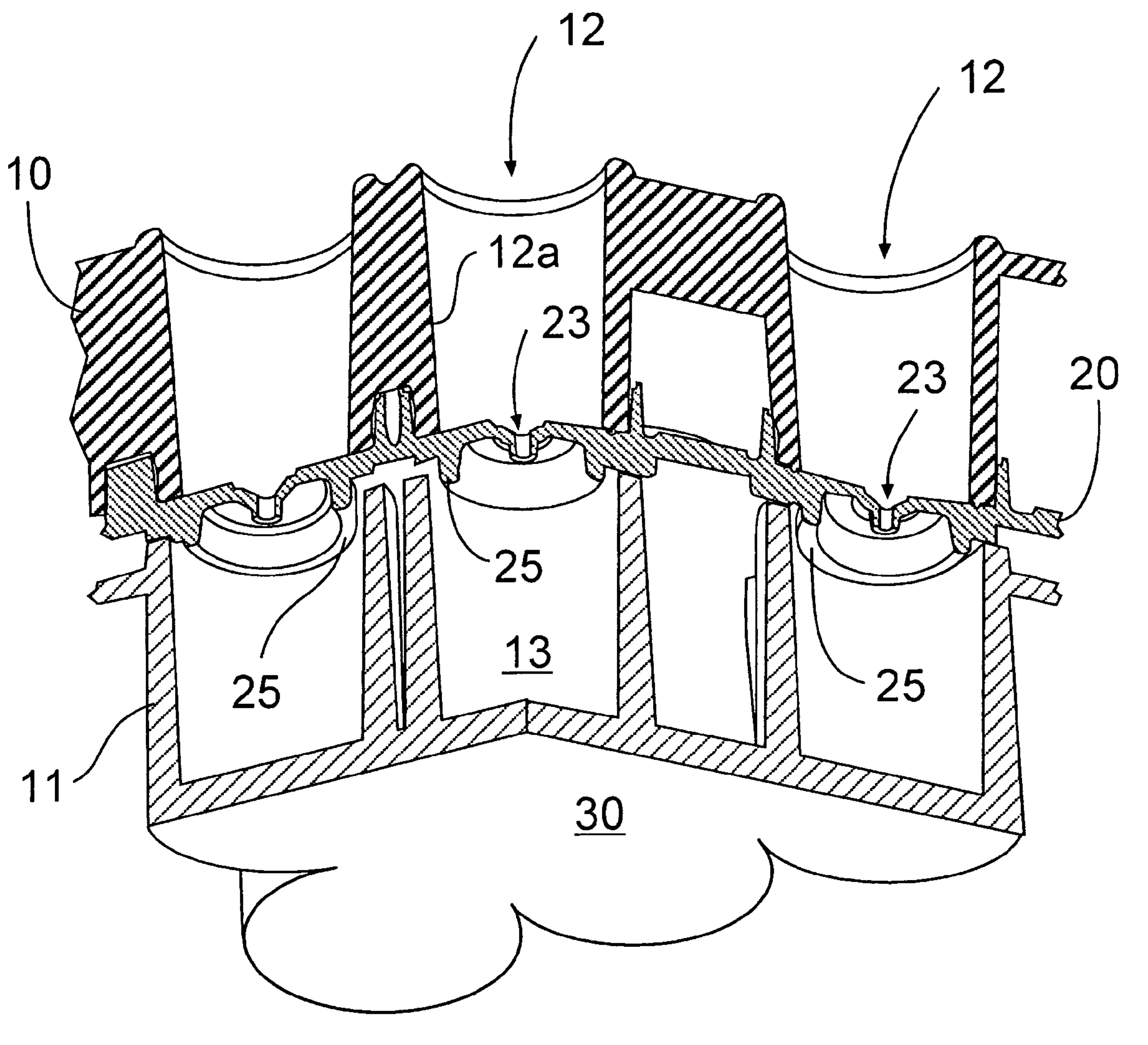
FIG. 1 is a perspective partial view of a multiwell device shown stacked on a collection plate with an underdrain therebetween, in accordance with an embodiment of the present invention.
Figure 2:
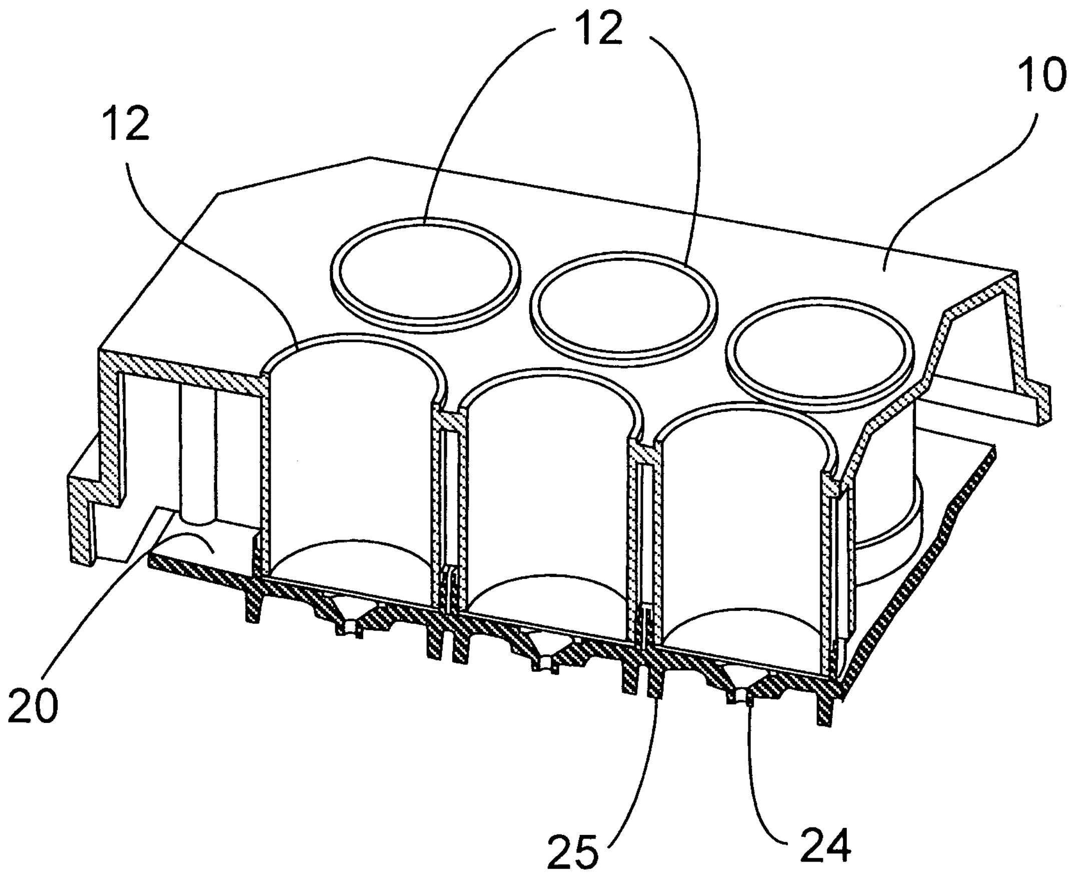
FIG. 2 is another perspective partial view of a multiwell device shown stacked on a collection plate with an underdrain therebetween, in accordance with an embodiment of the present invention.

Turning first to FIGS. 1 and 2, there is shown a multiwell assembly including a multiwell or base plate 10 and a collection plate 30. Although a 96-well plate array is illustrated, those skilled in the art will appreciate that the number of wells is not limited to 96; standard multiwell formats with 384, 1536 or fewer or more wells are within the scope of the present invention. Generally the number of wells in the collection plate 30 is determined by, and corresponds to, the number of wells in the base plate 10. The well or wells 12 are preferably cylindrical with fluid-impermeable walls, although other shapes, such as rectangular, can be used. Where a plurality of wells is present, the wells are adjacent or can share a common wall interconnected and are arranged in a uniform array, with uniform depths so that the tops and bottoms of the wells are planar or substantially planar. Preferably the array of wells comprises parallel rows of wells and parallel columns of wells, so that each well not situated on the outer perimeter of the plate is surrounded by other wells. In the 96 well configuration, this means an inside well is surrounded by 8 other wells. In other configurations, the number may be different. Each well includes one or more apertures formed in the bottom surface of the well, preferably centrally located, for communication with a fluid drain. The plate 10 is generally rectangular, although other shapes are within the scope of the present invention, keeping in mind the objective of meeting SBS dimensional guidelines. The plate 10 preferably is substantially flat.

Suitable materials of construction for the multiwell device base plate/filter plate of the present invention include polymers such as polycarbonates, polyesters, nylons, PTFE resins and other fluoropolymers, acrylic and methacrylic resins and copolymers, polysulphones, polyethersulphones, polyarylsulphones, polystyrenes, polyvinyl chlorides, chlorinated polyvinyl chlorides, ABS and its alloys and blends, polyolefins, preferably polyethylenes such as linear low density polyethylene, low density polyethylene, high density polyethylene, and ultrahigh molecular weight polyethylene and copolymers thereof, polypropylene and copolymers thereof and metallocene generated polyolefins. Preferred polymers are polyolefins, in particular polyethylenes and their copolymers, polystyrenes, polycarbonates and acrylic nitrile copolymers.

In the embodiment shown, the plate 10 includes a plurality of wells 12 having an open top and a bottom having a surface to which is sealed a substrate or support 50 (FIG. 4), such as a membrane (not shown). The substrate or support can be sealed by bonding to the well (or the underdrain) or can be held in place by compression between the well and the underdrain. The substrate can be inserted into each well from the top, such as by a vacuum transfer operation A disk of a size sufficient to cover the bottom of the well and be sealed to the well walls is formed such as by cutting, and transferred by vacuum inside each well 12. The disk is sealed to the well walls preferably by heat sealing, by contacting the periphery of the disk with a hot probe or the like. Care must be taken to avoid contacting the well walls with the hot probe to avoid melting. A suitable sealing technique is disclosed in U.S. Pat. No. 6,309,605 the disclosure of which is hereby incorporated by reference. Alternatively, an expansive substrate or membrane could be provided between the wells and the underdrain rather than discrete substrates or membranes for each well. This may be sealed to the periphery of the wells by ultrasonic bonding, adhesives, solvents or by compression between the plate 10 and the underdrain.

The type of porous member or membrane suitable is not particularly limited, and can include nitrocellulose, cellulose acetate, polycarbonate, polypropylene and PVDF microporous membranes, PES or ultrafiltration membranes such as those made from polysulfone, PVDF, cellulose or the like. Other suitable separation materials include depth filter media (e.g., cellulosic or glass fiber based), loose or matrix-embedded chromatrographic media (e.g., beads, frits and other porous partially-fused vitreous substances, electrophoretic gels, etc.). These materials, as well as membranes, can further comprise or be coated with or otherwise include filter aids and like additives, or other materials which amplify, reduce, change or otherwise modify the separation characteristics and qualities of the base underlying material, such as the application of target specific binding sites onto a chromatographic bead. Each well contains or is associated with its own porous member that can be the same or different from the porous member associated with one or more of the other wells. Each such individual porous member is preferably coextensive with the bottom of its respective well and extends across the opening or drain in each well.

Figure 3:
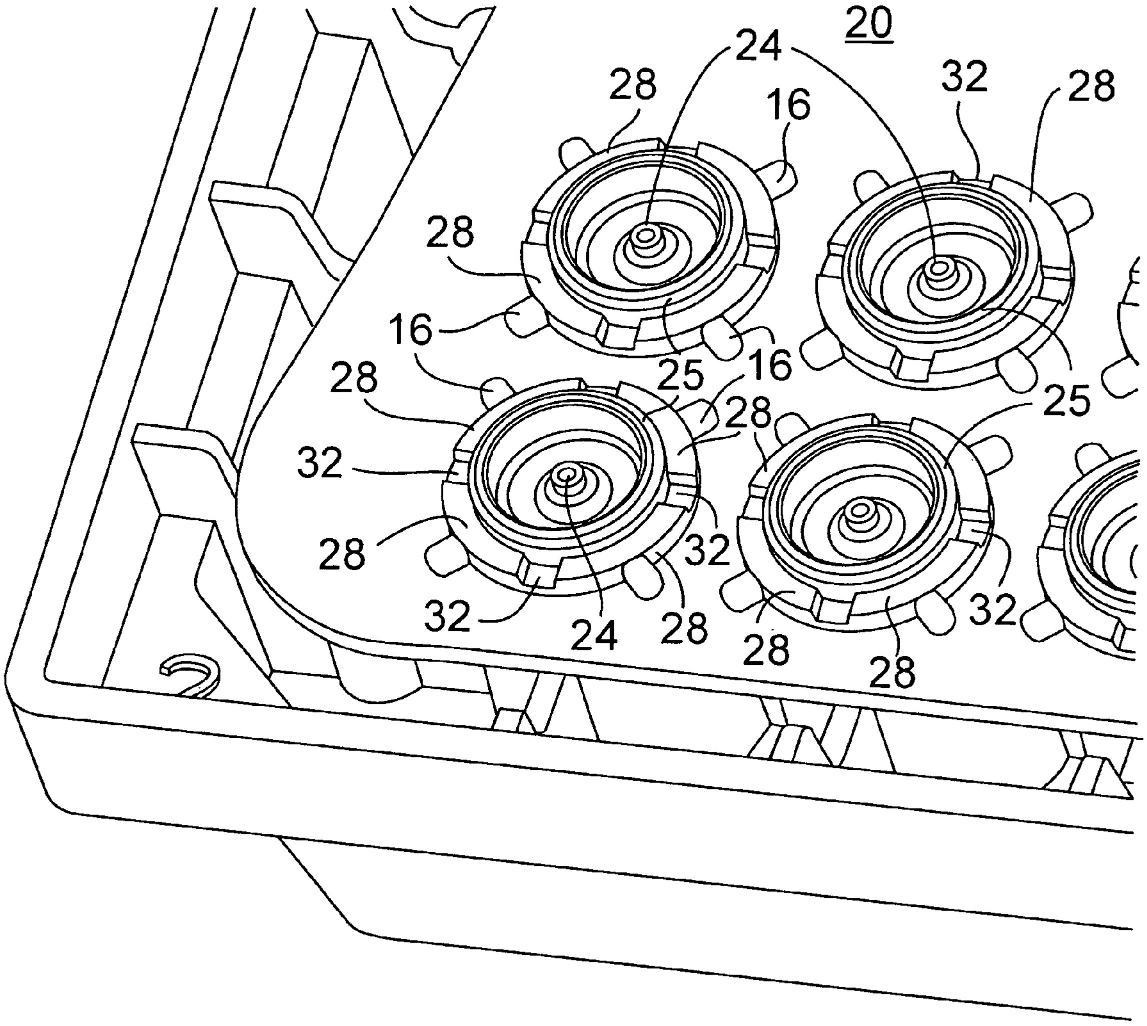
FIG. 3 is a bottom perspective view showing the underside of a multiwell device with an underdrain in accordance with an embodiment of the present invention.
Figure 6:
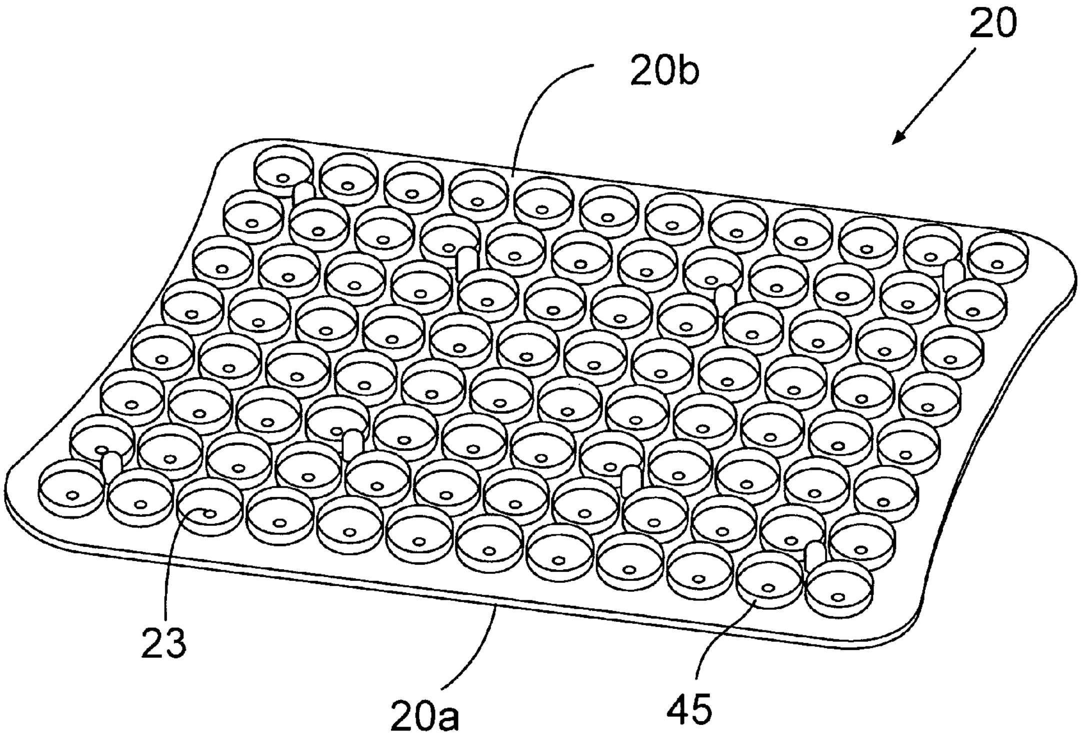
FIG. 6 is a perspective view of the top side of an underdrain in accordance with an embodiment of the present invention.

Turning now to FIGS. 3 and 6, the underside (or downstream side in the direction of fluid flow during filtration) of one embodiment of the underdrain 20 is shown. In the embodiment where the underdrain 20 is a removable component of the device, it is preferably a single, unitary, unassembled piece made of a polymeric material, such as by injection molding. Suitable polymeric materials include polyesters, nylons, PTFE resins and other fluoropolymers, acrylic and methacrylic resins and copolymers, polysulphones, polyethersulphones, polyarylsulphones, polyvinyl chlorides, chlorinated polyvinyl chlorides, ABS and its alloys and blends, polyurethanes, thermoset polymers, polyolefins (e.g., low density polyethylene, high density polyethylene, and ultrahigh molecular weight polyethylene and copolymers thereof, polypropylene and copolymers thereof), and metallocene generated polyolefins. Polyolefins are preferred, particularly polyethylenes and their copolymers.

Figure 4:
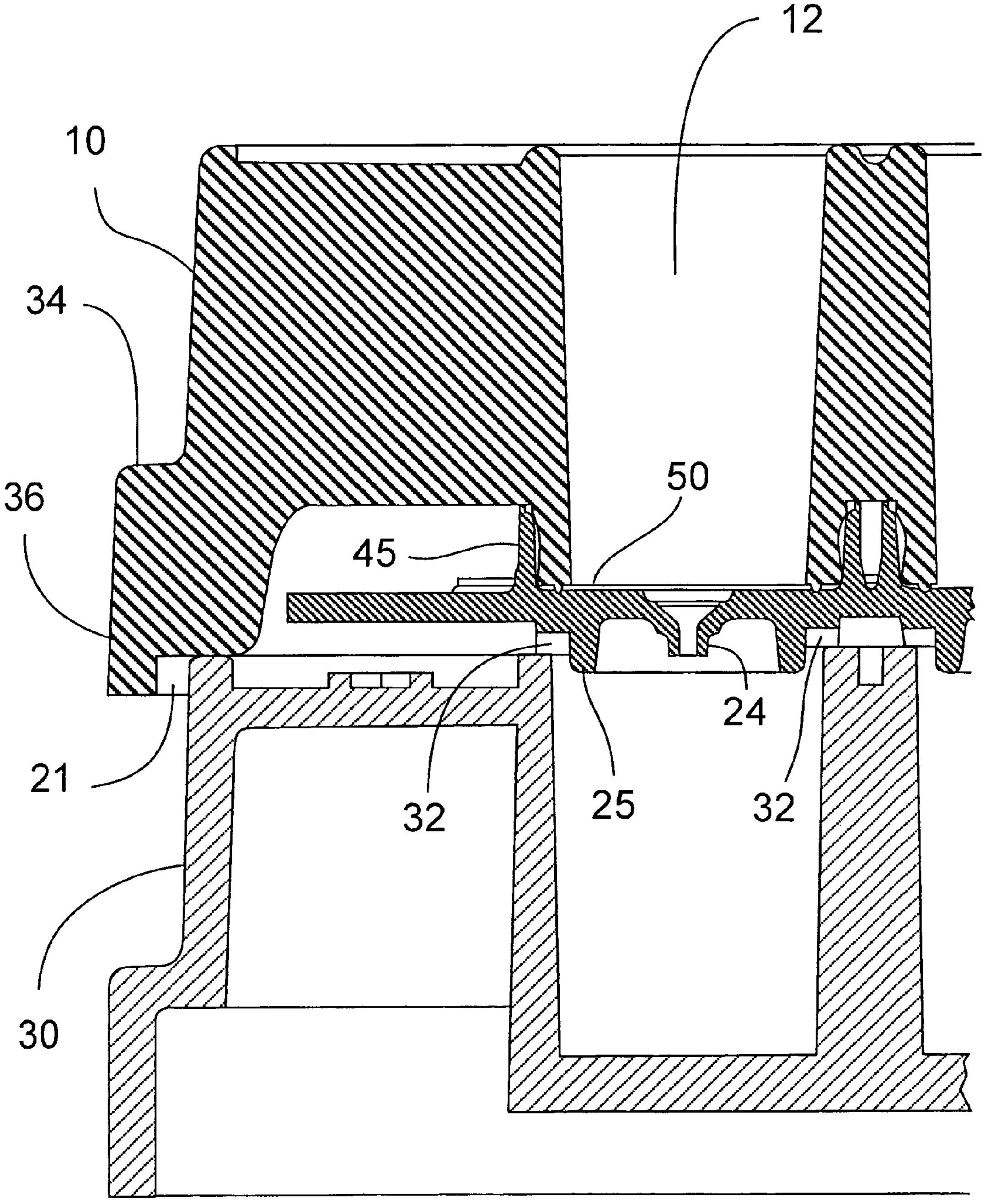
FIG. 4 is a cross-sectional view of a multiwell device shown stacked on a collection plate with an underdrain therebetween, illustrating the vent feature in accordance with an embodiment of the present invention.

The underdrain 20 has a plurality of drains 23 formed therein, each preferably centrally located with respect to a well of the base plate 10 when fixed to the plate. The drain 23 allows fluid (usually filtrate) in the well to escape the well 12 (usually after passing through the membrane 50) and potentially be collected, such as in a complementary well of a collection plate 30. The drain 23 is in fluid communication with spout 24 of the underdrain, preferably centrally located with respect to the drain 23. Most preferably, the central axis of each drain 23 is co-linear with the central axis of a respective spout 24. The spout 24 is defined by an annular wall that extends vertically downward, in the direction of fluid flow during filtration. Preferably each spout 24 extends vertically downward a distance sufficient to extend beyond the plane of the opening of a respective well of a collection plate 30 when the base and underdrain are positioned over the collection plate 30 as shown in FIG. 4. The configuration helps ensure that fluid from each well of the base plate 10 is properly directed to a respective well of the collection plate 30, thereby avoiding cross-talk and contamination from well to well.

Figure 5:
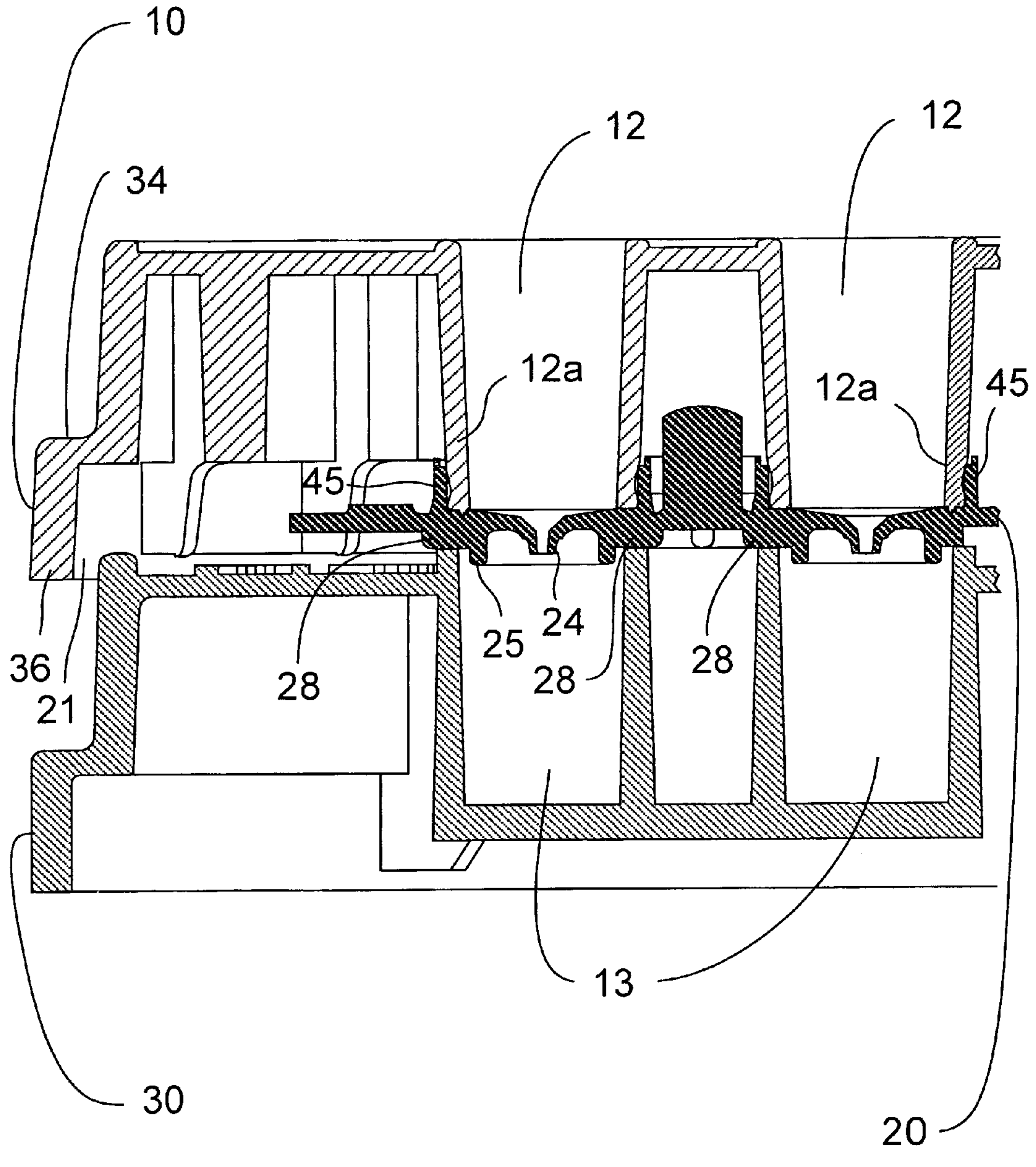
FIG. 5 is a cross-sectional view of a multiwell device shown stacked on a collection plate with an underdrain therebetween, in accordance with an embodiment of the present invention.

As best seen in FIGS. 3 and 4, circumscribing each spout 24 is a protecting member 25. Preferably the protecting member 25 is an annular ring, although other shapes that adequately perform the functions of the protecting ring are within the scope of the present invention. Each protecting member 25 preferably has an outside diameter smaller than the inside diameter of the bottom of a respective well 12 of the base 10. Similarly, each protecting member 25 preferably has an outside diameter smaller than the inside diameter of a respective well 13 of the collection plate 30 so that when the base 10 is stacked on the collection plate 30 as shown in FIGS. 4 and 5, each protecting member 25 sits in a respective well 13. The protecting member 25 serves to protect the spout 24 from damage and contamination, particularly when the device is placed on a surface such as a laboratory bench, as the protecting member 25 extends vertically downward (in the direction of fluid flow during filtration) a distance greater than the spout 24, and therefore provides the contact point with the surface on which it is placed. In addition, in the embodiment where the underdrain is removable from the base 10, the protecting members 25 provide the contact point against which force is applied to engage the underdrain with the base plate 10, which is generally a mechanical force fit.

Positioned radially outwardly (relative to spout 24) of the protecting member 25 are reinforcing members 28. Preferably the reinforcing members 28 associated with each spout 24 are equally spaced and symmetrically located about the respective protecting member 25 and spout 24. In the embodiment shown, there are four arc-shaped reinforcing members 28 associated with each spout 24, although more could be used and as few as one could be used without departing from the spirit of the invention. As best seen in FIGS. 1 and 5, the members 28 are suitably positioned so that when the underdrain is engaged with a base plate 10, the members 28 are located beneath (in the direction of fluid flow during filtration) each side wall 12A that defines each well 12. The members 28 thus provide additional rigidity to the underdrain and minimize any flexing of the underdrain that occurs upon application of a driving force, such as vacuum for filtration. Although arc-shaped ribs are exemplified in the drawings, other suitably shaped reinforcing members could be used.

As best seen in FIGS. 3 and 4, the reinforcing members 28 associated with each spout 24 are separated from each other by gaps 32, preferably also symmetrically located about each spout 24. The gaps 32 define vents for the passage of gas (e.g., air) in order to vent the collection plate during application of the driving force, typically vacuum or centrifugation. Where four reinforcing members 28 are provided for each respective spout, four gaps 32 are thereby provided. The gaps can be less than the height of the reinforcing members and still function as vents.

FIG. 3 also illustrates a plurality of spaced stand-off members 16 associated with each spout, with preferably one stand-off member 16 extending outwardly from each respective reinforcing member 28. In the preferred embodiment shown, there are four equally spaced stand-off members 16 associated with each spout 24 that is not positioned along the longitudinal ends 20A, 20B (FIG. 6) of the underdrain 20. The spouts that are positioned along the longitudinal ends of the underdrain preferably are devoid of stand-off members 16 in the area the longitudinal edges of the underdrain, so that they do not interfere with the placement of the underdrain (and base plate 10) in a conventional vacuum manifold. Specifically, conventional vacuum manifold assemblies often include a grid that is used to support the base plate 10 and underdrain during filtration. Since the base plate/underdrain assembly is supported on the grid along its longitudinal edges, those edges should be devoid of ribs or other structure that would interfere with the proper positioning of the assembly on the grid. The stand-off members prevent the drain from sitting directly on the collection plate 30. Those skilled in the art will appreciate that although ribs are exemplified in the drawings as suitable stand-off members, other shaped members such as cylindrical posts could be used.

Turning again to FIGS. 4 and 5, a gap 21 is also formed between the perimeter of the base plate 10 and the collection plate 30 to further vent gas vented from the wells. The perimeter of the base plate 10 has a shoulder 34 and skirt 36 that lies beyond the perimeter of the collection plate when the base plate 10 is positioned and supported on the collection plate 30. The gap 21 is formed between the skirt 36 and the outer perimeter wall of the collection plate 30, and provides a pathway for gases to vent.

Figure 7:
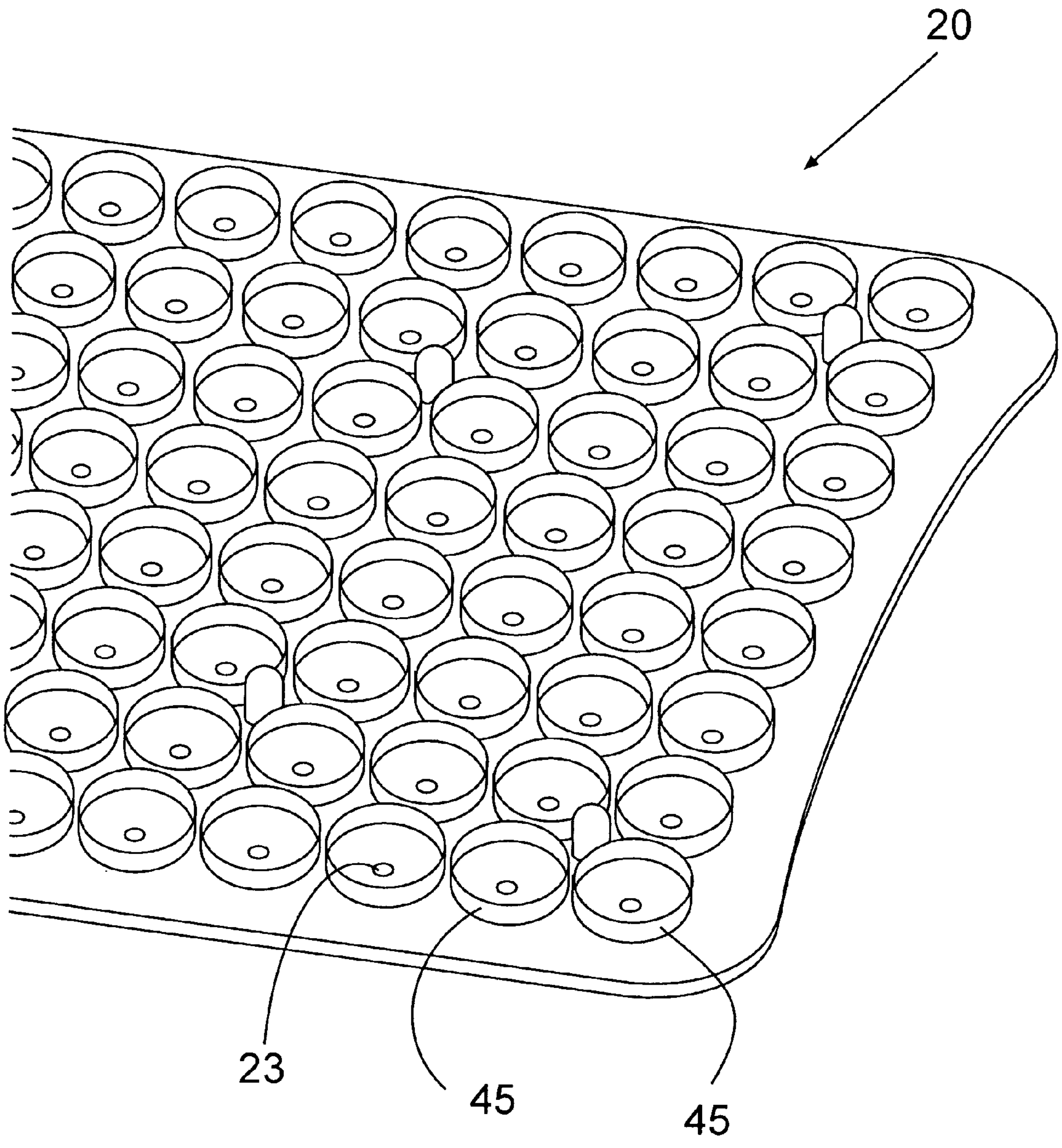
FIG. 7 is a perspective view showing a portion of the top side of the underdrain of FIG. 6 in enlarged detail.

FIGS. 6 and 7 illustrate the top or upstream side of an underdrain 20 that faces the base plate 10 when assembled. Each annular ring 45 on the top surface of the underdrain is suitable dimensioned to receive a respective well 12 of a base plate 10, preferably by a mechanical force fit (see also FIGS. 4 and 5).

The invention claimed is:

1. A unitary multiwall filtration device comprising:
- a multiwell base plate,
- an underdrain, and
- a collection plate,
- wherein the multiwell base plate is stacked on the underdrain, and the underdrain is stacked on the collection plate forming a unitary structure,
- the multiwell base plate having,
  - (i) a perimeter, wherein the perimeter of the base plate includes a shoulder and a skirt,
  - (ii) an upstream surface,
  - (iii) a downstream surface,
  - (iv) a plurality of base plate wells, and
  - (v) a plurality of porous substrates, wherein the porous substrates are selected from the group consisting of a microporous membrane, an ultrafiltration membrane, a depth filter media, a matrix-embedded chromatographic media, a loose chromatographic media, and combinations thereof,
- wherein each base plate well has an interior bottom surface including one or more apertures formed therein, and the porous substrate is located in the base plate well covering the bottom surface,
- the underdrain having,
  - (i) an upstream side adjacent the downstream surface of the base plate for receiving the base plate wells, wherein the upstream side of the underdrain includes,
    - (a) a plurality of drains corresponding in number to the base plate wells, each drain in fluid communication with a corresponding base plate well, and
    - (b) a plurality of annular rings corresponding in number to the drains, each annular ring circumscribing a corresponding drain, wherein each annular ring is dimensioned to receive a corresponding base plate well, and
  - (ii) a downstream side having,
    - (a) a plurality of spouts corresponding in number to the drains on the underdrain upstream side, each spout in fluid communication with a corresponding drain;
    - (b) a plurality of spout protecting rings corresponding in number to the spouts, each spout protecting ring. circumscribing a corresponding spout;
    - (c) a plurality of underdrain reinforcing ribs, wherein a group of four underdrain reinforcing ribs are associated with each spout, each underdrain reinforcing rib in the group are separated from each other by an underdrain gap, each underdrain gap in fluid communication with the corresponding spout, and each underdrain reinforcing rib in the group are positioned radially outwardly of a corresponding spout protecting ring circumscribing the spout, wherein each underdrain gap provides a fluid pathway for defining a vent that allows for the passage of a gas from the wells of the base plate to the environment during application of a vacuum during fluid filtration; and (d) a plurality of underdrain protecting stand-off ribs, wherein a group of four underdrain protecting stand-off ribs are associated with each spout, such that each one of the four underdrain protecting stand-off ribs extend outwardly of a corresponding underdrain reinforcing rib, such that during fluid filtration and under pressure a fluid flows from the base plate wells, through the substrate, into and out of the underdrain spouts;

the collection plate having, (i) a top surface, (ii) an outer perimeter wall, and (iii) a plurality of collection plate wells corresponding in number to the spouts on the underdrain, the collection plate being disposed downstream with the respect to the underdrain such that each collection plate well is in fluid communication with a corresponding spout, and the multiwell base plate positioned on the top surface of the collection plate, such that during filtration a fluid flows from the base plate wells, through the membrane, into and out of the underdrain spouts of the underdrain, and into the corresponding collection plate wells.

* * * * *

UNITED STATES PATENT AND TRADEMARK OFFICE

CERTIFICATE OF CORRECTION

PATENT NO. : 8,753,588 B2
APPLICATION NO. : 10/961778
DATED : June 17, 2014
INVENTOR(S) : Kenneth G. Desilets et al.

It is certified that error appears in the above-identified patent and that said Letters Patent is hereby corrected as shown below:

In the Claims:

In column 6, line 19, in claim 1 delete “multiwall” and insert -- multiwell --, therefor.

In column 6, line 63, in claim 1 delete “ring.” and insert -- ring --, therefor.

Signed and Sealed this
Twenty-sixth Day of August, 2014

Michelle K. Lee

Michelle K. Lee
*Deputy Director of the United States Patent and Trademark Office*